United States Patent
Metker et al.

(10) Patent No.: US 11,773,987 B2
(45) Date of Patent: Oct. 3, 2023

(54) FLOW MODULATOR FOR A FLUID

(71) Applicant: Pittway Sarl, Rolle (CH)

(72) Inventors: Clemens Metker, Bad Iburg (DE); Wim Munsterhuis, Dalen (NL); Gerrit Jan Baarda, Emmen (NL); Andreas Kammerahl, Lemfoerde (DE); Martin Petersmann, Osnabrueck (DE); Anton Quatmann, Vechta (DE); Ulrich Oldehus, Lohne (DE)

(73) Assignee: Pittway Sarl, Rolle (CH)

( * ) Notice: Subject to any disclaimer, the term of this patent is extended or adjusted under 35 U.S.C. 154(b) by 377 days.

(21) Appl. No.: 17/015,740

(22) Filed: Sep. 9, 2020

(65) Prior Publication Data
US 2021/0080123 A1    Mar. 18, 2021

(30) Foreign Application Priority Data
Sep. 13, 2019    (EP) ..................................... 19197288

(51) Int. Cl.
*F24D 19/10*    (2006.01)
*F24D 5/00*    (2022.01)
*F24D 19/00*    (2006.01)

(52) U.S. Cl.
CPC ........... *F24D 19/1084* (2013.01); *F24D 5/00* (2013.01); *F24D 19/0075* (2013.01)

(58) Field of Classification Search
USPC ....................................................... 237/2 A
See application file for complete search history.

(56) References Cited

U.S. PATENT DOCUMENTS

| 3,014,489 A | * | 12/1961 | Lamp, Jr. | .................. | F16K 3/34 |
| | | | | | 137/625.15 |
| 4,915,132 A | * | 4/1990 | Hodge | ................ | F16K 11/0743 |
| | | | | | 128/205.24 |

(Continued)

FOREIGN PATENT DOCUMENTS

| DE | 40 30 717 A1 | 4/1992 |
| EP | 2580505 A2 | 4/2013 |

OTHER PUBLICATIONS

Extended European Search Report of the Intellectual Property Office of Europe for EP19197288.4 with report dated Mar. 17, 2020 and search date of Feb. 28, 2020.

*Primary Examiner* — Steven B McAllister
*Assistant Examiner* — John E Bargero
(74) *Attorney, Agent, or Firm* — Greenberg Traurig, LLP; Ryan D. Sharp; David J. Dykeman (57) ABSTRACT

Flow modulator (10) for a fluid like combustion gas, comprising: a housing (11), a modulator body (14) positioned with the housing (11), and a valve body (18) positioned with the housing (11). The modulator body (14) has a flow channel (15) and an opening (16) providing together a flow passage (17) for the fluid. The valve body (18) is provided by a foil element (19), wherein the foil element (19) has an opening (20) for the fluid, wherein the foil element (19) is rotatable relative to the modulator body (14) to modulate the flow of the fluid by adjusting an overlap between the opening (20) of the valve body (18) and the flow passage (17) of the modulator body (14), and wherein the foil element (19) is positioned up-stream of the modulator body (14) such that an inlet pressure of the fluid presses the foil element (19) against the modulator body (14) thereby providing a sealing level between the foil element (19) and the modulator body (14).

13 Claims, 5 Drawing Sheets

(56) References Cited

U.S. PATENT DOCUMENTS

| | | | |
|---|---|---|---|
| 5,201,532 A | 4/1993 | Salesky et al. | |
| 7,918,241 B1 * | 4/2011 | Chang | G05D 23/1313 137/607 |
| 9,127,775 B2 | 9/2015 | Helfer et al. | |
| 2017/0356552 A1 * | 12/2017 | Cassel | F16K 3/085 |

* cited by examiner

FLOW MODULATOR FOR A FLUID

The invention relates to a flow modulator for a fluid like combustion gas.

DE 40 30 717 A1 discloses a flow modulator for a fluid having a housing and a valve body. The valve body is provided by a foil element. The foil element has an opening for the fluid. The foil element is carried by a driver. The driver and the foil element are both positioned within a chamber of the housing. The driver and the foil element are both linear displaceable within the chamber of the housing thereby changing an overlap between an opening of the housing and the opening of the foil element.

Against this background, a novel flow modulator for a fluid like combustion gas is provided.

The flow modulator comprises a housing. The flow modulator further comprises a modulator body positioned with the housing. The modulator body has a flow channel and an opening providing together a flow passage for the fluid. The flow modulator further comprises a valve body also positioned with the housing. The valve body is provided by a foil element. The foil element has an opening for the fluid. The foil element is rotatable relative to the modulator body to modulate the flow of the fluid by adjusting an overlap between the opening of the valve body and the flow passage of the modulator body. The foil element is positioned upstream of the modulator body such that an inlet pressure of the fluid presses the foil element against the modulator body thereby providing a sealing level between the foil element and the modulator body.

The novel flow modulator provides a reliable flow modulation of the fluid while having compact dimensions.

According to a preferred embodiment, the flow channel of the modulator body is provided by a bow-shaped nut within a sealing surface of the modulator body abutting a sealing surface of the foil element. The flow channel of the modulator body has a first end and a second end at which the opening of the modulator body is provided. A width and/or a depth of the nut is/are increasing from the first end of the nut towards the opening of the modulator body. By adapting the width and/or depth of the nut it possible to provide any required flow characteristics of the flow modulator.

According to a preferred embodiment, the flow modulator comprises a driver for the foil element being rotatable by an actuator and being positioned with the housing, wherein the foil element is carried by the driver in a torsionally rigid manner such that the a rotation of the driver causes a rotation of the foil element, and wherein the foil element is further carried by the driver in a resiliently flexible manner such that the foil element is elastically deformable by the inlet pressure of the fluid. The flow modulator provides a reliable flow modulation of the fluid while having compact dimensions.

According to a preferred embodiment, the flow modulator comprises a spring being positioned with the housing, wherein the spring acts on the driver pressing the driver towards the sealing surface of the modulator body and pressing the foil element against the sealing surface of the modulator body. The flow modulator provides a reliable flow modulation of the fluid while having compact dimensions.

Preferred developments of the invention are provided by the dependent claims and the description of the drawings. Exemplary embodiments are explained in more detail on the basis of the drawing, in which:

The present invention relates to a flow modulator 10 for a fluid, preferably for a gaseous fluid like combustion gas. The flow modulator 10 is preferably part of a gas burner appliance of a heating system. A flow modulator for a gaseous fluid can also be called gas flow modulator.

The flow modulator 10 comprises a housing 11. The housing 11 has a first housing part 11a and a second housing part 11b both defining an interior chamber 11c of the housing 11. The first housing part 11a has a first opening 12 providing an inlet opening of the flow modulator 10 for the fluid. The second housing part 11b has a first opening 13 providing an outlet opening of the flow modulator 10 for the fluid.

The flow modulator 10 comprises a modulator body 14 (see FIG. 4) positioned with the housing 11, namely within the interior chamber 11c of the housing 11. The modulator body 14 has a flow channel 15 for the fluid and an opening 16 for the fluid providing together a flow passage 17 for the fluid. A sealing element 37 is positioned between the modulator body 14 and the second housing part 11b.

The flow modulator 10 comprises a valve body 18 (see FIG. 3) also positioned with the housing 11. The valve body 18 is positioned together with the modulator body 14 within the interior chamber 11c of the housing 11.

Figure 1:
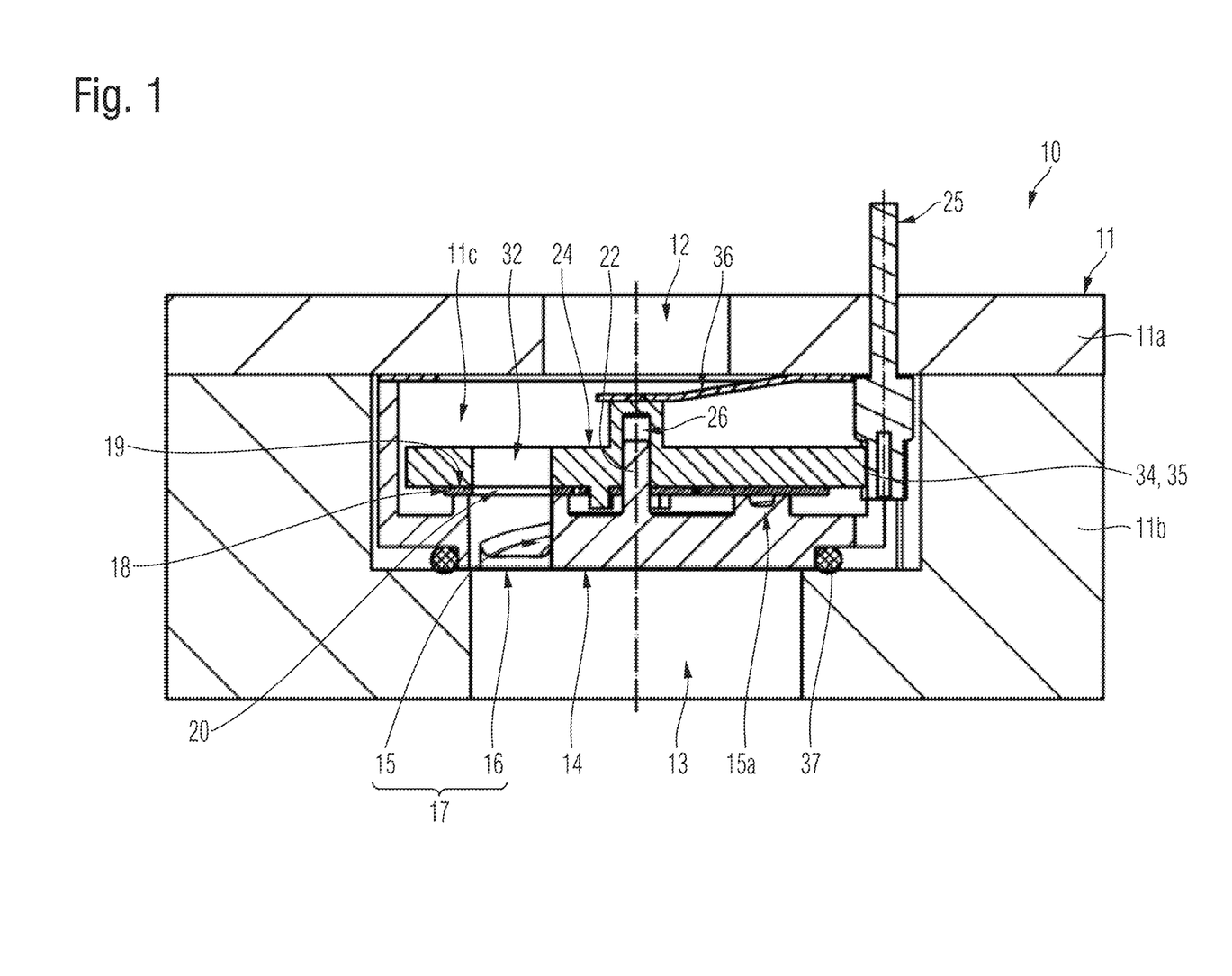
FIG. 1 shows a cross section of a flow modulator according to a preferred embodiment of the invention.
Figure 2:
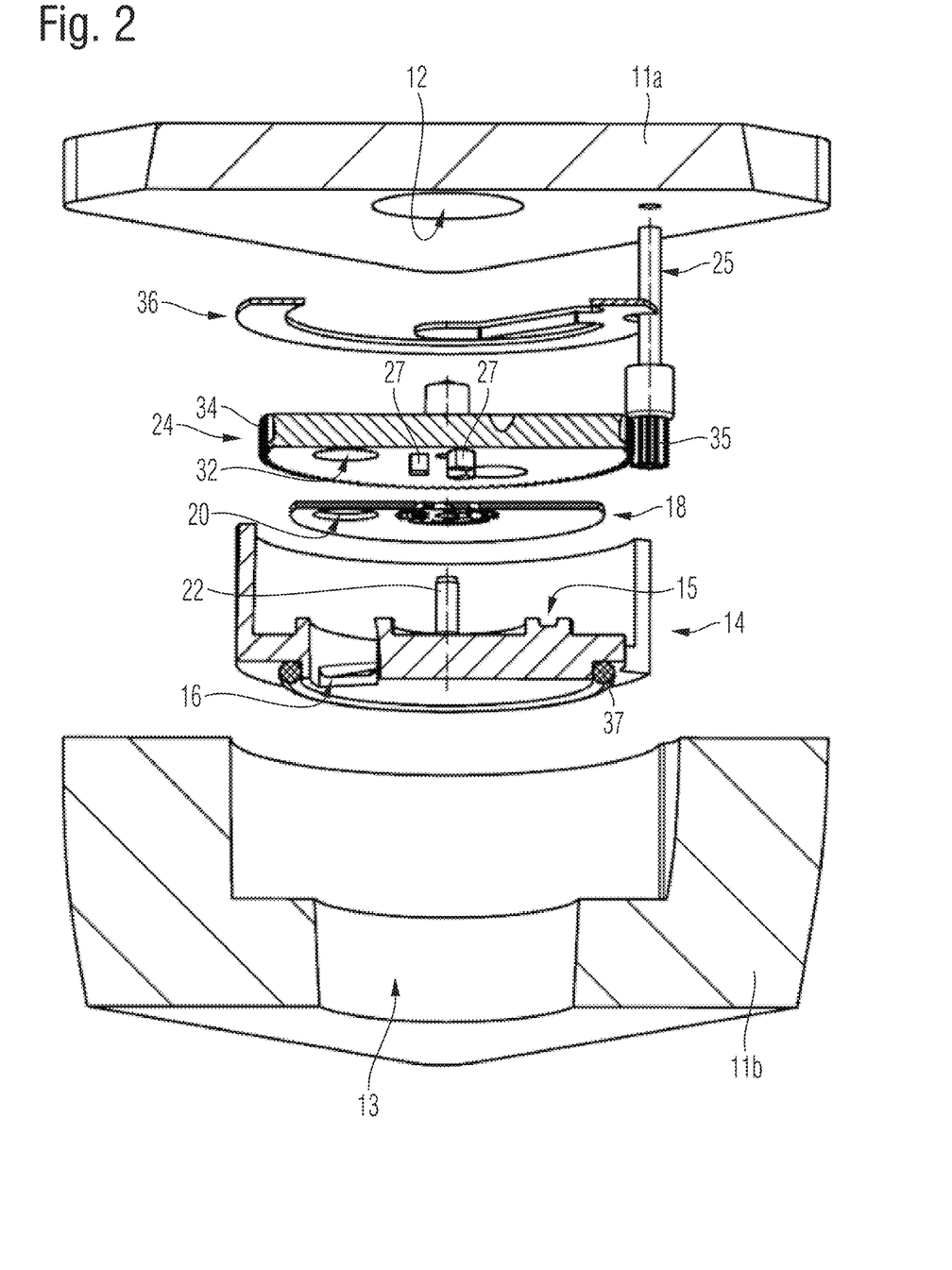
FIG. 2 shows an exploded perspective view of the flow modulator of FIG. 1.
Figure 3:
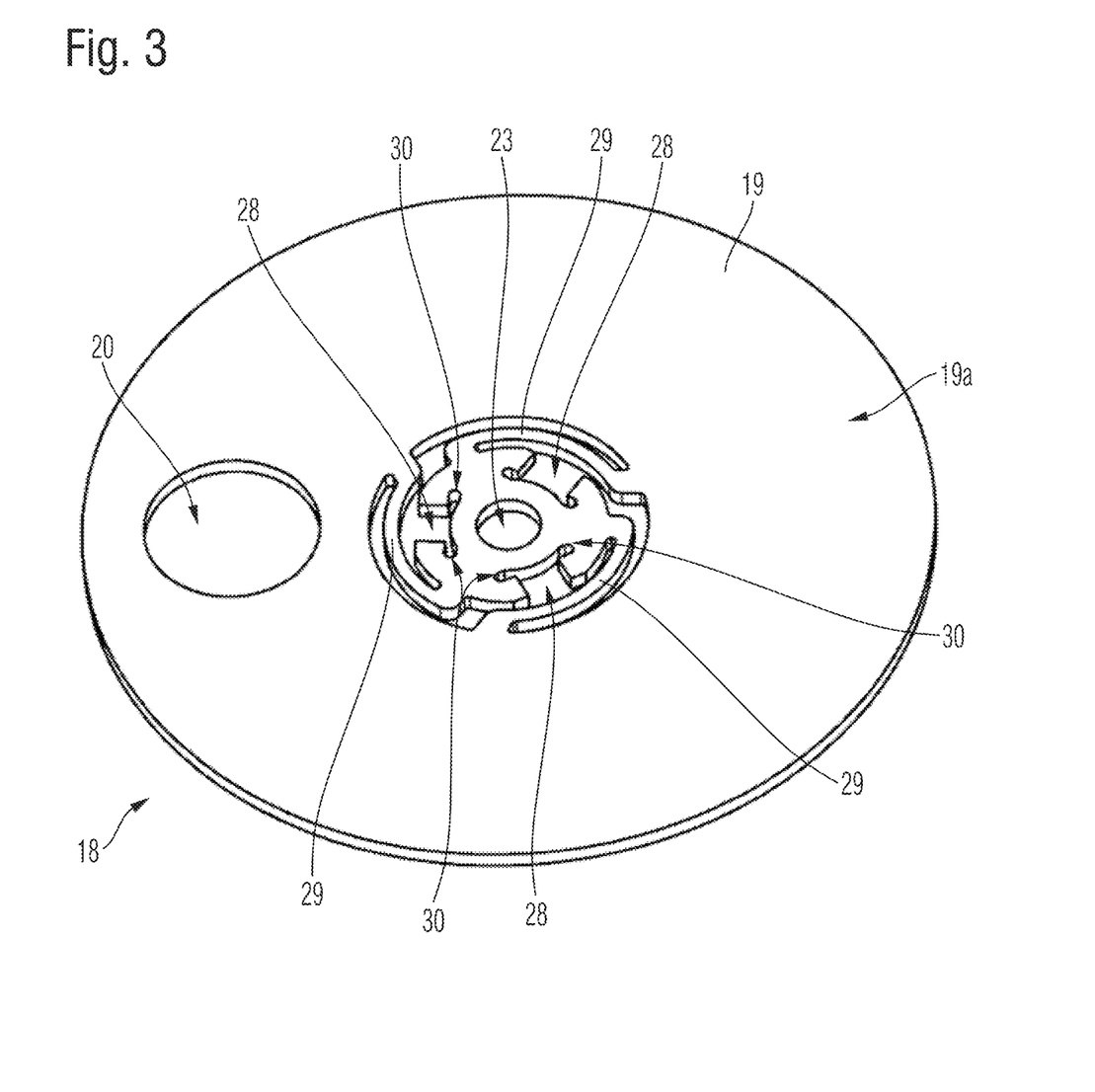
FIG. 3 shows a perspective view of a detail of the flow modulator of FIG. 1.

The valve body 18 is provided by a foil element 19. The foil element 19 is elastically deformable. The foil element can also be called foil. The foil element or foil is relatively flat.

The foil element 19 has an opening 20 for the fluid. The foil element 19 is rotatable relative to the modulator body 14 to modulate the flow of the fluid by adjusting an overlap between the opening 20 of the valve body 18 and the flow passage 17 of the modulator body 16.

The foil element 19 is positioned upstream of the modulator body 16 such that an inlet pressure of the fluid presses the foil element 19 against the modulator body 16 thereby providing a sealing level between the foil element 19 and the modulator body 14. The sealing level between the foil element 19 and the modulator body 14 prevents against an unwanted secondary fluid flow. The fluid has to flow through the flow passage 17 of the modulator body 16.

Figure 4:
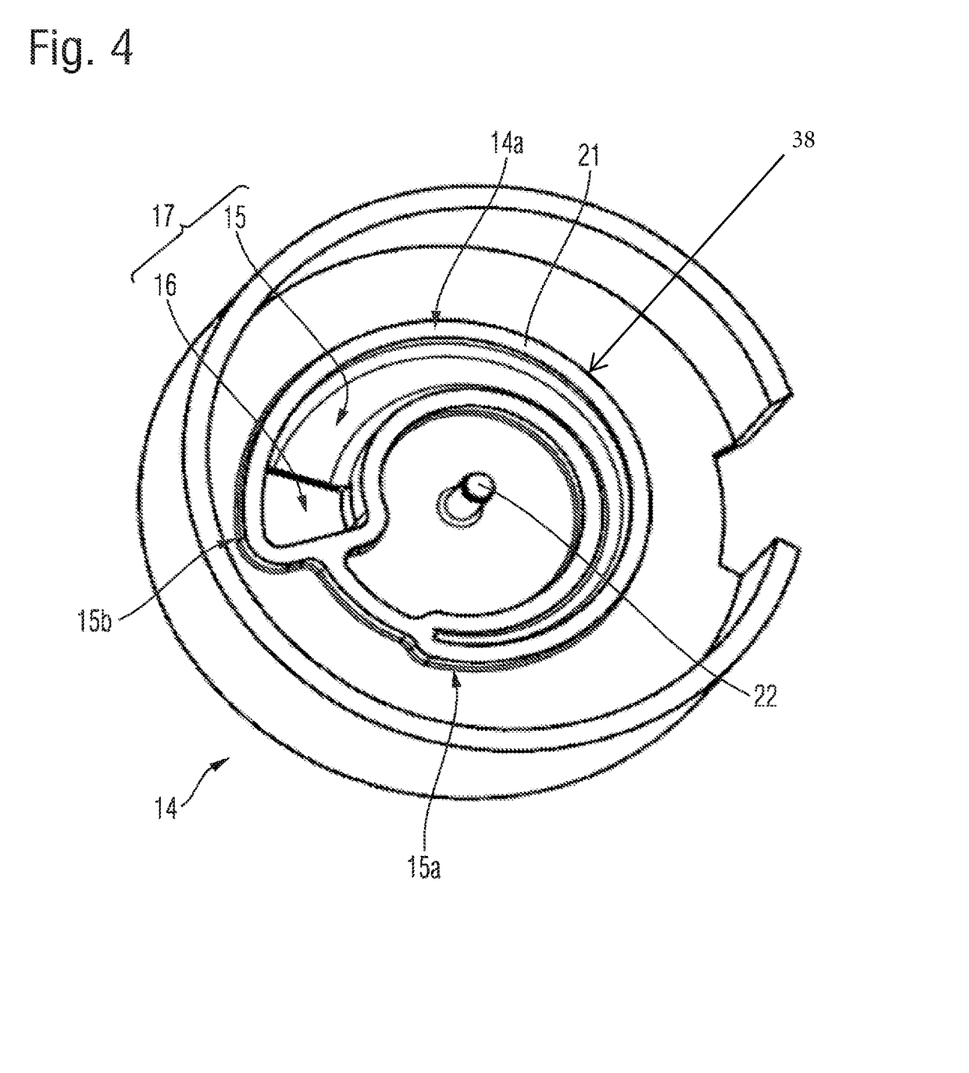
FIG. 4 shows a perspective view of another detail of the flow modulator of FIG. 1.

The flow channel 15 of the modulator body 14 is provided by a bow-shaped nut 38 within a sealing surface 14a of the modulator body 14. The surface 14a of the modulator body 14 abuts a sealing surface 19a of the foil element 19. The sealing level between the foil element 19 and the modulator body 14 does not require high surface flatness at the sealing surfaces 14a, 19a. The flexibility of the foil element 19 compensates irregularities in the sealing surfaces 14a, 19a.

The flow channel 15 of the modulator body 14 has first end 15a and a second end 15b. The opening 16 of the modulator body 14 is provided at the second end of the flow channel 15. A width and/or a depth of the nut 38 and thereby of the flow channel 15 increases from the first end 15a towards the second end 15b and thereby towards the opening 16 of the modulator body 14. By adapting the width and/or the depth of the flow channel 15 it possible to provide any desired flow characteristics of the flow modulator 10.

The first end 15a and the second end 15b are preferably spaced apart from each other in circumferential direction by a distance corresponding to or being greater than the diameter of the opening 20 of the valve body 18. In that case it is possible to rotate the valve body 18 relative to the modulator body 14 such there is no overlap between the opening 20 of the valve body 18 and the flow channel 15. In such a relative position with no overlap between the opening 20 of the valve body 18 and the flow channel 15 there is no fluid flow through the flow modulator 10.

In the shown embodiment the nut 38 providing the flow channel 15 is partially confined by a preferably raised contour 21 of the modulator body 14 defining the sealing surface 14a of the modulator body 14. It is also possible to omit the raised contour 21. In this case the entire surface of the modulator body 14 facing towards the valve body 18 and surrounding the flow channel 15 would act as sealing surface 14a. With the raised contour 21 the size of the sealing surface 14a can be reduced compared to a solution not having a raised contour.

The valve body 18, namely the sealing surface 19a of the foil element 19, is pressed against the sealing surface 14a of the modulator body 14 provided by the raised contour 21. The sealing level between the foil element 19 and the modulator body 14 is then provided between the foil element 19 of the raised contour 21 of the modulator body 14.

The modulator body 14 has a guide pin 22 penetrating through a central opening 23 of the valve body 18 and into the driver 24. The valve body 18 is rotatable relative to the modulator body 14 around a rotation axis defined by said guide pin 22. When rotating the valve body 18 relative to the modulator body 14 the overlap between the opening 20 of the valve body 18 and the flow channel 15 becomes changed thereby modulating the fluid flow.

Figure 5:
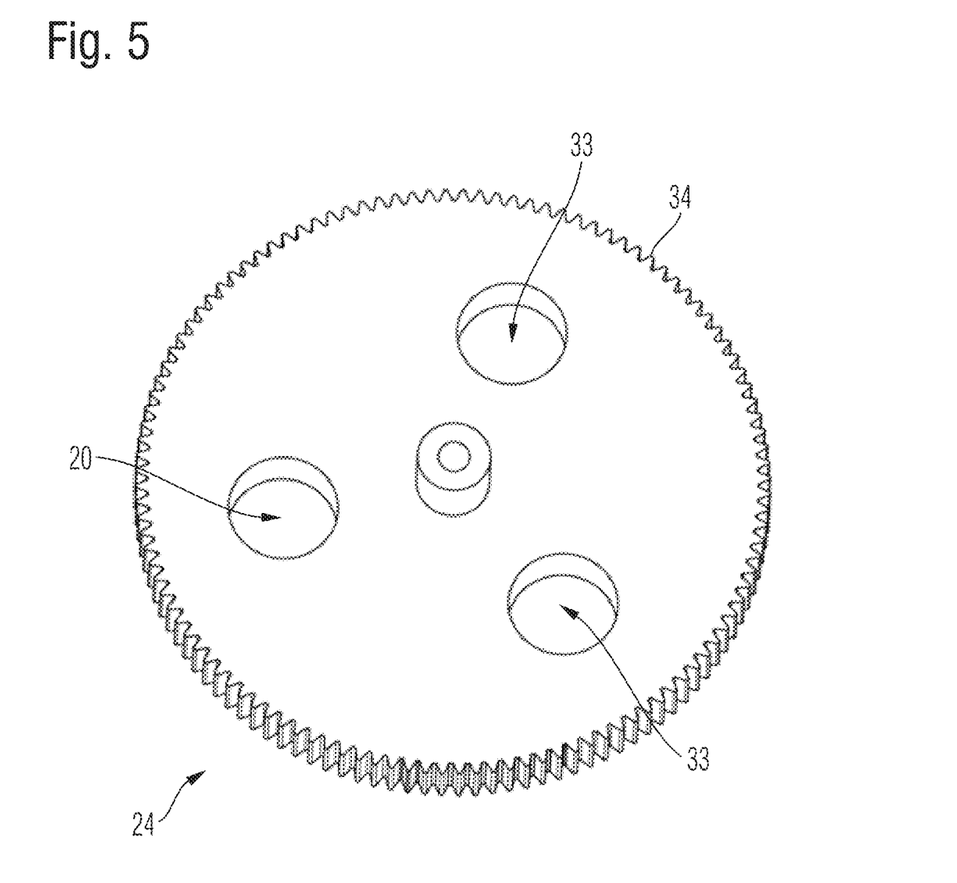
FIG. 5 shows a perspective view of another detail of the flow modulator of FIG. 1.

The flow modulator 10 further comprises a driver 24 (see FIG. 5).

The foil element 19 is connected to the driver 24.

The connection of the driver 24 and the foil element 19 is adapted to provide both a sufficient flexibility of the foil element 19 in the region of the sealing level between the foil element 19 of the modulator body 14 as well as a sufficient stability of the foil element 19 to allow a secure displacement of the foil element 19 without a deformation of the foil element 19.

The driver 24 for the foil element 19 is rotatable by an actuator 25. The driver 24 is positioned with the housing 11, namely within the interior chamber 11c of the housing 11. The guide pin 22 of the modulator body 14 penetrates through the central opening 23 of the valve body 18 into a recess 26 with the driver 24.

Alternatively, the guide pin may be provided at the driver 24. In This case, the guide pin would penetrate through the central opening 23 of the valve body 18 into a recess with the modulator body 14.

In a further alternative the guide pin can be omitted by using a bearing between the driver 24 and the modulator body 14 at defined circumferential positions of the same.

The foil element 19 is carried by the driver 24 in a torsionally rigid manner such that a rotation of the driver 24 causes a rotation of the foil element 19. This allows a secure displacement of the foil element 19 without a deformation of the foil element 19.

The driver 24 and the foil element 19 become always commonly rotated relative to the modulator body 14 without changing the relative circumferential position between the driver 24 and the foil element 19.

The foil element 19 is further carried by the driver 24 in a resiliently flexible manner such that the foil element 19 is elastically deformable by the inlet pressure of the fluid. This provides sufficient flexibility of the foil element 19 in the region of the sealing level between the foil element 19 and the modulator body 14.

The driver 24 has protrusions 27 penetrating into recesses 28 of the foil element 19.

The protrusions 27 and recesses 28 are shaped or dimensioned to provide a press fit connection between the foil element 19 with the driver 24 and to provide the torsionally rigid connection of the foil element 19 to the driver 24.

The dimensions of the protrusions 27 are somewhat greater than the dimensions of recesses 28. Circumferential cut-outs 30 at the radial inner ends of the recesses 28 allow a deformation of the foil element 19 in the region of the recesses 28 when inserting the protrusions 27 into the same thereby providing the press fit connection between the foil element 19 and the protrusions 27 of the driver 24.

The foil element 19 has spring arms 29 providing the torsionally rigid and resiliently flexible connection of the foil element 19 to the driver 24.

The recesses 28 of the foil element 19 are positioned circumferentially around the central opening 23 within the foil element 19. The spring arms 29 of the foil element 19 are positioned circumferentially around the recesses 28 of the foil element 19.

At a radial inner side of the spring arms 29 the same are partially delimited by the recesses 28. Additional recesses 31 delimit the spring arms 29 at the radial inner side and a radial outer side of the same.

The driver 24 has a first opening 32 for the fluid overlapping the opening 20 of the foil element 19. The first opening 32 of the driver 24 and the opening 20 of the foil element 19 remain always in the same relative circumferential position. These openings 20, 32 allow a fluid flow through the foil element 19 and the driver 24.

The driver 24 may have at least one second opening 33 for the fluid not overlapping the opening 20 of the foil element 29. This opening 33 allows the fluid inlet pressure to act on the foil element 19 in order to press the same against the modulator body 14.

The driver 24 has a peripheral zone carrying a gearing 34 acting together with a gearing 35 of the actuator 25 to transform a rotation of the actuator 25 into a rotation of the driver 24 and of the foil element 19.

The flow modulator 10 further comprises a spring 36 being positioned with the housing 11. The spring 36 acts on the driver 24 pressing the driver 24 towards the modulator body 14 and the foil element 19 against the sealing surface 14a of the modulator body 14. Preferably, the spring 36 is a leaf spring bracing against the driver 24 and against the housing 11.

The spring 36 may also be coil spring. However, a leaf spring is preferred to provide small dimensions of the flow modulator 10.

The housing 11, the modulator body 14 and the driver 24 are relatively rigid compared to the foil element 19 while the foil element 19 is relatively flexible compared to the housing 11, the modulator body 14 and the driver 24. The foil element 19 is elastically deformable by the inlet pressure of the fluid.

The modulator body 14 and the driver 24 are preferably made from plastics. The foil element 19 is preferably made from metal. This provided low friction between the modulator body 14 and the foil element 19.

The foil element 19 can be rotated by the actuator 25 and by the driver 24 over the rigid modulator body 14 having the flow passage 17.

The flow direction of the fluid is defined in such a way that foil element 19 is pressed against the sealing surface 14a of the modulator body 14 by the fluid inlet pressure. The foil element 19 is connected to the driver 24 in such a way that its flexibility is not impaired and can adapt to the sealing surface 14a of the modulator body 14 with the aid of the inlet pressure of the fluid. This creates a sealing level between the foil element 19 and the modulator 24 which prevents unwanted secondary fluid flows. The modulated fluid flow is adjusted by the rotation of the foil element 19 thereby adjusting on how far the flow passage 17 of the modulator body 14 and the opening 20 in the foil element 19 themselves overlap. Depending on the relative position of foil element 19 and the modulator body 14 a variable flow resistance is provided and thus a defined fluid flow can be set. The foil element 19 covers a certain edge region of the flow passage 17, rests on this edge region and forms a sealing surface with this edge region. In the shown embodiment said edge region is provided by the raised contour 21 of the sealing surface 14a of the modulator body 14.

As mentioned above the flow direction of the fluid is defined in such a way that the foil element 19 is pressed against the sealing surface 14a of the modulator body 14 by the inlet pressure of the fluid. The foil element 19 is flexible so that it can adapt to the unevenness of the sealing surface 14a of the modulator body 14. This minimizes unwanted leakage fluid flows in the area of the sealing level and precisely adjusts the modulated fluid flow.

The stability or flexibility of foil element 19 and the cross section of the flow passage 17 in the modulator body 14 are designed in such a way so that foil element 19 is not pressed into the flow passage 17 of the modulator body 14, especially into the opening 16, by the inlet pressure of the fluid and thus not damaged.

As mentioned above, foil element 19 is preferably made from a metal. When the foil element 19 is made from a metal, the same has preferably a thickness between 0.05 mm and 0.2 mm, most preferably between 0.08 mm to 0.15 mm.

The material of the foil element 19 and the thickness of the same is preferably chosen to provide a defined ratio $r=f/t$ between the deflection f of the foil element 19 in the region of the opening 16 of the modulator body 14 and the thickness t of the foil element 19. The ratio r may be between 0.5% and 250%.

In case of a foil element 19 made from a metal having a thickness between 0.08 mm and 0.15 mm said ratio r is between 2% and 30%.

LIST OF REFERENCE SIGNS 10 flow modulator
11 housing
11a first housing part
11b second housing part
11c chamber
12 inlet opening
13 outlet opening
14 modulator body
14a sealing surface
15 flow channel
15a first end
15b second end
16 opening
17 flow passage
18 valve body
19 foil element
19a sealing surface
20 opening
21 raised contour
22 guide pin
23 opening
24 driver
25 actuator
26 recess
27 protrusion
28 recess
29 spring arm
30 cut-outs
31 recess
32 opening
33 opening
34 gearing
35 gearing
36 spring
37 sealing element
38 bow-shaped nut

The invention claimed is:

1. A flow modulator comprising:
   a housing;
   a modulator body positioned with the housing,
      wherein the modulator body has a flow channel and an opening providing together a flow passage for a fluid;
   a valve body also positioned with the housing,
      wherein the valve body is provided by a foil element,
         wherein the foil element has an opening for the fluid;
         wherein the foil element is rotatable relative to the modulator body to modulate a flow of the fluid by adjusting an overlap between the opening of the valve body and the flow passage of the modulator body,
         wherein the foil element is positioned upstream of the modulator body such that an inlet pressure of the fluid presses the foil element against the modulator body thereby providing a sealing level between the foil element and the modulator body,
   wherein the flow channel of the modulator body is provided by a bow-shaped nut within a sealing surface of the modulator body abutting a sealing surface of the foil element,
   wherein the flow channel of the modulator body has a first end and a second end,
   wherein the opening of the modulator body is provided at the second end of the flow channel,
   wherein a width, a depth, or a combination of the width and the depth of the flow channel increases from the first end towards the opening of the modulator body, and
   wherein the flow channel is partially confined by a raised contour of the modulator body providing the sealing surface of the modulator body.

2. The flow modulator of claim 1, wherein the housing and the modulator body are both rigid compared with the foil element, and wherein the foil element is flexible compared with the housing and the modulator body, such that the foil element is elastically deformable by the inlet pressure of the fluid.

3. The flow modulator of claim 1, wherein a driver for the foil element being rotatable by an actuator and being positioned with the housing,
   wherein the foil element is carried by the driver such that a rotation of the driver causes a rotation of the foil element and such that the foil element is elastically deformable by the inlet pressure of the fluid.

4. The flow modulator of claim 3, wherein the foil element is carried by the driver in a torsionally rigid manner such that the rotation of the driver causes the rotation of the foil element, providing a torsionally rigid connection, and wherein the foil element is carried by the driver in resiliently flexible manner such that the foil element is elastically deformable by the inlet pressure of the fluid, such that the torsionally rigid connection is a resiliently flexible and torsionally rigid connection.

5. The flow modulator of claim 4, wherein the driver has protrusions penetrating into recesses of the foil element providing a press fit connection between the foil element with the driver and providing the torsionally rigid connection of the foil element to the driver.

6. The flow modulator of claim 4, wherein the foil element has spring arms providing the resiliently flexible and torsionally rigid connection of the foil element to the driver.

7. The flow modulator of claim 5, wherein the recesses of the foil element are positioned circularly around a central opening within the foil element which receives a guide pin of the modulator body, the foil element has spring arms providing the resiliently flexible and torsionally rigid connection of the foil element to the driver, and the spring arms of the foil element are positioned circularly around the recesses of the foil element.

8. The flow modulator of claim 3, wherein the driver has a first opening for the fluid having the same overlap with the opening of the foil element for the fluid in any position of the driver.

9. The flow modulator of claim 3, wherein the driver has a second opening for the fluid having the no overlap with the opening of the foil element for the fluid in any position of the driver.

10. The flow modulator of claim 3, wherein the driver has a peripheral zone carrying a gearing acting together with a gearing of the actuator to transform a rotation of the actuator into a common rotation of the driver and the foil element.

11. The flow modulator of claim 3, wherein a spring being positioned with the housing, wherein the spring acts on the driver pressing the driver towards and the foil element against the sealing surface of the modulator body.

12. The flow modulator of claim 11, wherein the spring is a leaf spring bracing against the driver and against the housing.

13. The flow modulator of claim 1, wherein the flow modulator is a gas flow modulator for a gaseous fluid.

\* \* \* \* \*

UNITED STATES PATENT AND TRADEMARK OFFICE
CERTIFICATE OF CORRECTION

PATENT NO. : 11,773,987 B2
APPLICATION NO. : 17/015740
DATED : October 3, 2023
INVENTOR(S) : Clemens Metker et al.

Page 1 of 1

It is certified that error appears in the above-identified patent and that said Letters Patent is hereby corrected as shown below:

In the Claims

In Claim 1, Column 6, Line 27 please replace "a valve body also positioned with the housing," with --a valve body positioned with the housing,--

Signed and Sealed this
Thirty-first Day of October, 2023

Katherine Kelly Vidal
*Director of the United States Patent and Trademark Office*